J. FAUBEL.
Churn-Power.

No. 216,665.  Patented June 17, 1879.

WITNESSES:
C. Neveux
C. Sedgwick

INVENTOR:
J. Faubel
BY Munn & Co
ATTORNEYS.

UNITED STATES PATENT OFFICE.

JACOB FAUBEL, OF JEFFERSONVILLE, NEW YORK.

IMPROVEMENT IN CHURN-POWERS.

Specification forming part of Letters Patent No. 216,665, dated June 17, 1879; application filed March 29, 1879.

*To all whom it may concern:*

Be it known that I, JACOB FAUBEL, of Jeffersonville, in the county of Sullivan and State of New York, have invented a new and useful Improvement in Churn-Powers, of which the following is a specification.

My improvements relate to spring-powers for operating churns; and the invention consists in certain novel features of construction and arrangement, whereby the power is more effectually and uniformly applied and regulated than heretofore.

My improved motor is shown in the accompanying drawings, wherein—

Figure 1:
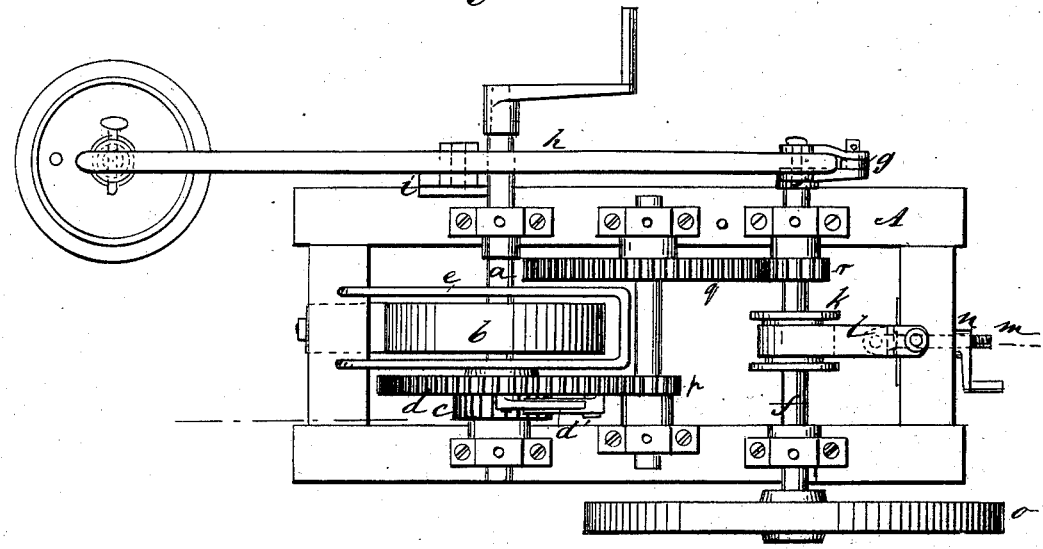
Figure 2:
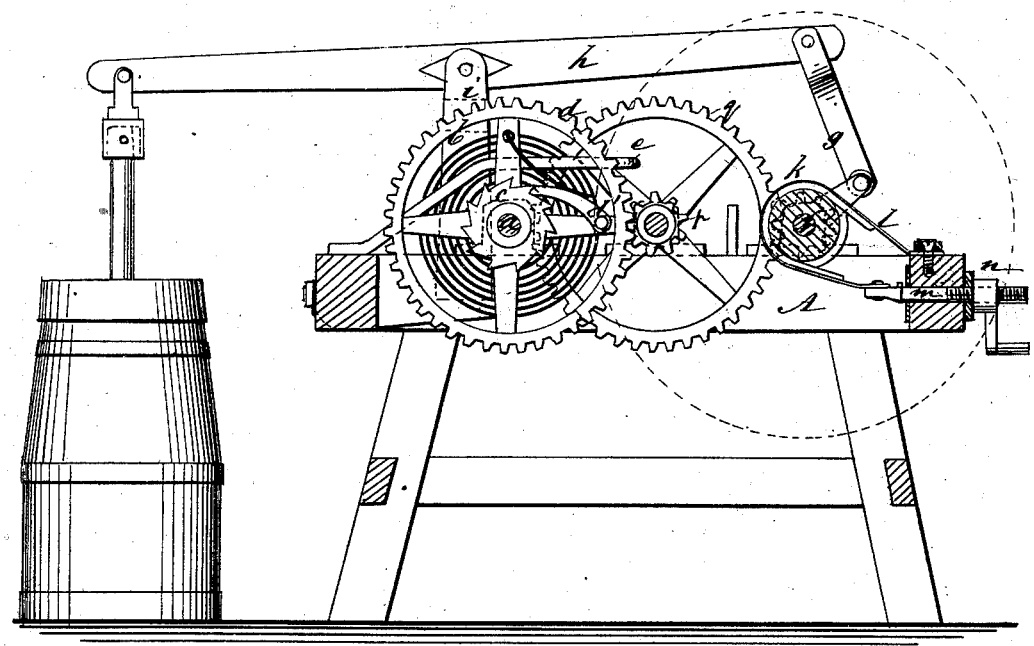

Figure 1 is a top view. Fig. 2 is a side elevation.

Similar letters of reference indicate corresponding parts.

The mechanism is supported upon a stand, A, that may be of any desired character. $a$, A, is a shaft fitted in bearings on stand A, and carrying a coiled spring, $b$, one end of which spring is connected to $a$ and the other to frame A.

Upon $a$ is a ratchet-wheel, $c$, and a gear-wheel, $d$, also on $a$, carries a pawl, $d'$, that engages with ratchet $c$, whereby, when the spring is wound, its reaction revolves gear $d$ with shaft $a$.

A wire loop, $e$, attached to frame A, extends at each side of spring $b$, to retain the coils in place.

The wheel $d$ communicates motion by a train of gearing $p\ q\ r$ to the crank-shaft $f$, which, by a pitman, $g$, operates the walking-beam $h$, that is hung on a standard, $i$, from frame A. The churn-dash will be connected to beam $h$, as shown; and for driving a revolving churn a coupling will be fitted to shaft $f$ in place of the crank. Upon shaft $f$ is a fly-wheel, $o$, and a flanged wheel, $k$.

$l$ is a friction-strap, connected to frame A by one end passing around wheel $k$, and with its other end connected to a screw-rod, $m$, that passes loosely through the end of frame A. Upon the outer end of screw $m$ is a nut, $n$, by which the strap $l$ may be tightened more or less on wheel $k$. By these means the speed of shaft $f$ is regulated and the exertion of the spring-power rendered uniform.

The spring is to be wound by a crank applied to the extension of shaft $a$, or in any other desired manner. The spring will be adapted to give the required power.

Having thus described my invention, I claim as new, and desire to secure by Letters Patent—

The combination of the spring $b$, one end of which is secured to the frame A and the other to the shaft $a$, the wire guide-loop $e$, the shaft $a$, the ratchet $c$, pawl $d'$, the gear-wheels $d$, $p$, $q$, and $r$, the shaft $f$, the flanged wheel $k$, the friction-strap $l$, the screw $m$, and nut $n$ with the frame A, and with the pitman $g$ and walking-beam $h$, substantially as and for the purpose set forth.

JACOB FAUBEL.

Witnesses:
VALENTINE SCHMIDT,
ANDREW BIETZ.